Patented Nov. 22, 1938

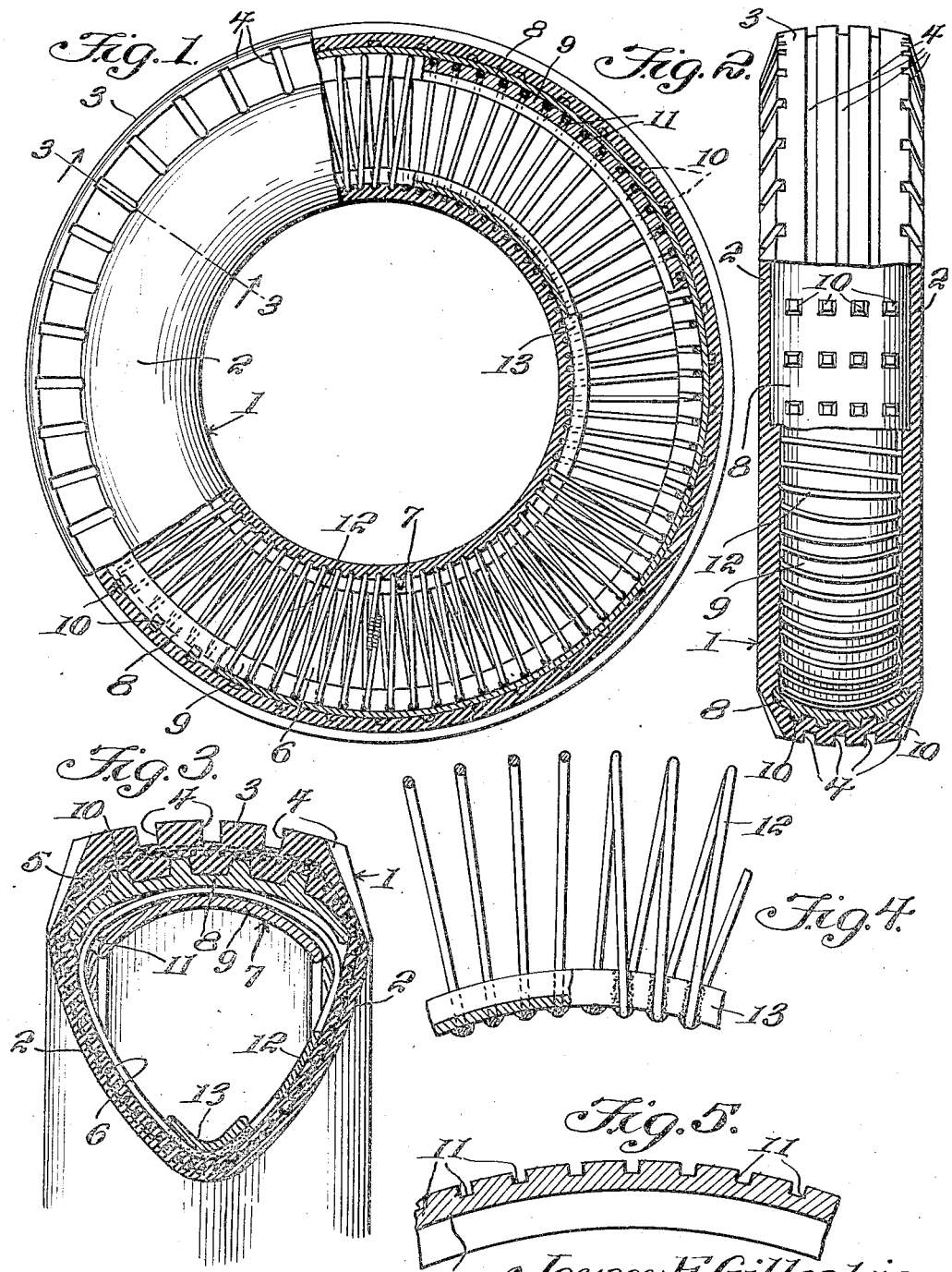

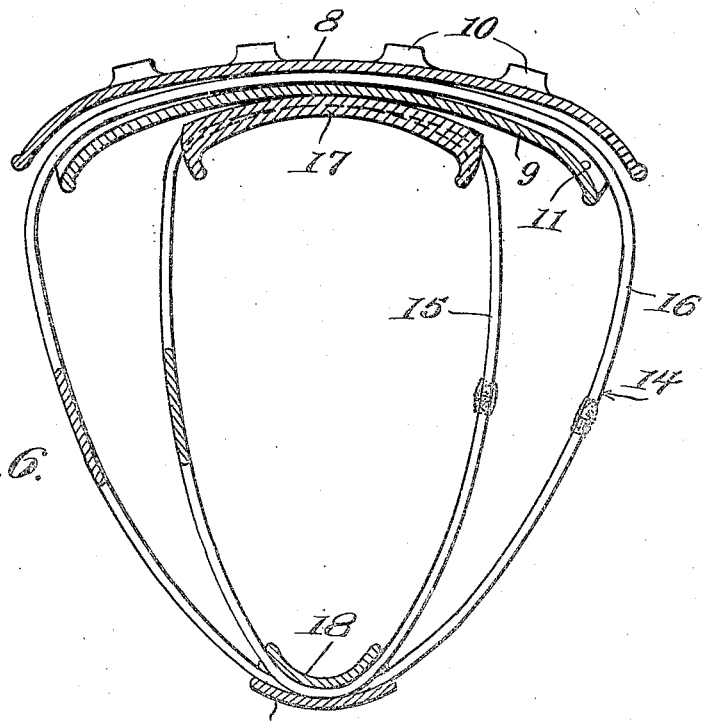
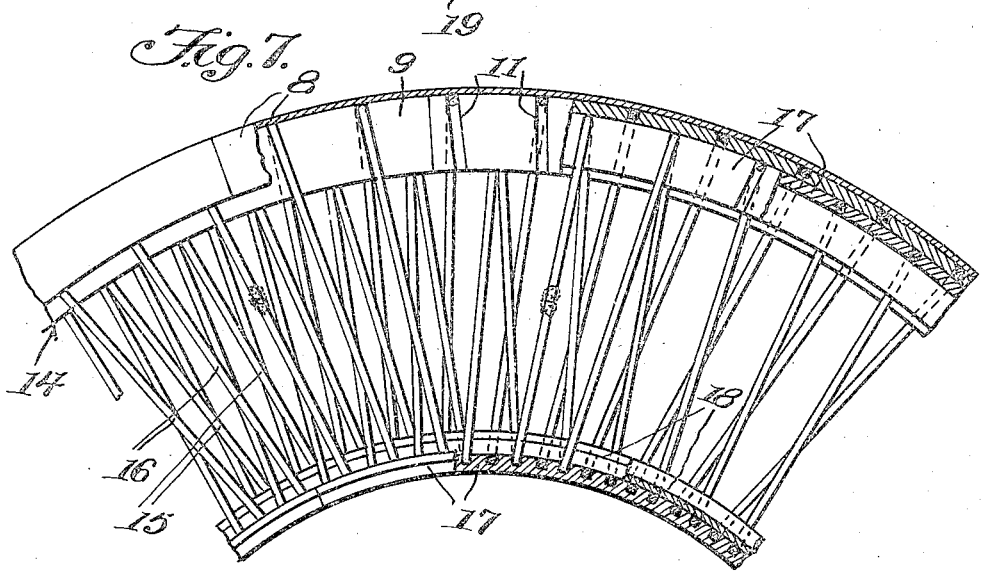

2,137,670

UNITED STATES PATENT OFFICE 2,137,670

VEHICLE WHEEL TIRE

Jayson E. Gillespie, Lincoln, Nebr.

Application May 3, 1937, Serial No. 140,549

2 Claims. (Cl. 152—288)

This invention relates to vehicle tires and has for the primary object the provision of a device of this character which will efficiently absorb road shocks and provide maximum road traction and durability and will eliminate the disadvantages and accidents sometimes caused by punctures or blowouts of pneumatic tires.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a tire constructed in accordance with my invention.

Figure 2 is an edge elevation partly in section showing the tire.

Figure 3 is a transverse sectional view taken on the line 3—3 of Figure 1.

Figure 4 is a fragmentary sectional view showing a coiled resilient element and a tire element employed between the convolutions of the coiled element.

Figure 5 is a fragmentary longitudinal sectional view showing a grooved inner plate.

Figure 6 is a transverse sectional view illustrating a modified form of my invention.

Figure 7 is a fragmentary horizontal sectional view illustrating the same.

Referring in detail to the drawings, the numeral 1 indicates a casing or shoe including side walls 2 and a tread 3 in which are formed anti-skid grooves 4. The side walls 2 are joined, as shown in Figure 3. The casing or shoe is constructed of rubber with fabric embedded therein, as indicated at 5. The fabric is composed of a series of interwoven cords for the purpose of strengthening the rubber. The side walls and tread formed as heretofore described provide in the shoe or casing a chamber 6 to receive a core 7 capable of expanding the shoe or casing to support the latter with varying loads on the shoe or casing. The core is capable of yielding to absorb road shocks and consists of spaced plates 8 and 9. These plates underlie the tread 3 and formed upon the plate 8 is a series of lugs 10 and are embedded in the rubber of the tread 3 for the purpose of preventing the plate 8 from creeping within the shoe or casing. The plates 8 and 9 are substantially arcuately curved in cross section and have the edges thereof flared away from each other. Formed in the plate 9 is a series of spaced grooves 11 extending substantially transversely of the plate. The grooves receive the convolutions of a coiled resilient element 12 confining portions of each convolution between the plates 8 and 9 while the other portions of the convolutions contact the side walls 2 of the shoe or casing. The convolutions of the coiled element 12 are joined by a retaining strip 13. The retaining strip is transversely curved to follow the contour of the convolutions of the coiled elements and is welded or otherwise secured to the convolutions. A core 7 constructed in the foregoing manner is capable of yielding to road shocks, consequently absorbing said shocks and also is capable of withstanding varying loads upon the tire. A tire of this character will be economical to construct and will be durable and free of disadvantages found in pneumatic tires such as punctures, blowouts and the like. The convolutions of the spring are welded on the plates 8 and 9 and on the retaining strip 13. The flared edges of the plates 8 and 9 permit the spring to flex freely.

It is to be understood that the shoe or casing is built up about the core after the assembling of the latter.

Referring to my modified form of the invention, as shown in Figures 6 and 7, the core is indicated by the character 14 and consists of inner and outer coiled elements 15 and 16. These coiled elements are similarly shaped and also similarly shaped to the coil element 12 except that the coiled element 15 is smaller than the coiled element 16. The plates 8 and 9 are employed with an additional plate 17. The shape of the plate 17 is substantially like the plates 8 and 9 except its width is less and is provided with grooves to receive the convolutions of the coiled element 15. The coiled element 15 is suitably secured in the grooves. Also engaged with the convolutions of the coiled elements 15 and 16 are plates 18 and 19 both transversely curved and have formed in their opposed faces grooves to receive the convolutions of the coiled elements. The convolutions may be secured in the grooves of the plates 18 and 19.

What is claimed is:

1. A cushion tire comprising a yieldable casing having a chamber, annular superimposed plates arranged in said chamber and one of said plates having offset portions embedded in the casing, a coiled resilient element having the convolutions thereof passing between said plates, said plates having grooves to receive the convolutions of said resilient elements, and a transversely curved annular plate positioned opposite to the first-named plates and having the convolutions of the coiled elements secured thereto and of a width less than the width of the first-named plates.

2. A cushion tire comprising a yieldable casing having a chamber, annular superimposed plates arranged in said chamber and one of said plates having offset portions embedded in the casing, coiled resilient elements fitting one within the other and having the convolutions passing between said plates, said plates having grooves to receive the convolutions of said resilient elements, and transversely curved and superimposed annular plates receiving therebetween the convolutions of said coiled elements and positioned opposite to the first-named plates and of a width less than the width of the first-named plates and having grooves in their opposing faces to receive the convolutions of said coiled elements.

JAYSON E. GILLESPIE.